(12) United States Patent
Kia et al.

(10) Patent No.: US 8,328,971 B2
(45) Date of Patent: Dec. 11, 2012

(54) LAMINATED STEEL WITH COMPLIANT VISCOELASTIC CORE

(75) Inventors: Hamid G. Kia, Bloomfield Hills, MI (US); Mark W. Verbrugge, Troy, MI (US); Douglas L. Faulkner, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 320 days.

(21) Appl. No.: 12/769,690

(22) Filed: Apr. 29, 2010

(65) Prior Publication Data

US 2011/0265933 A1 Nov. 3, 2011

(51) Int. Cl.
*B29C 44/00* (2006.01)
*B32B 5/18* (2006.01)
*B32B 5/20* (2006.01)
*B32B 15/085* (2006.01)

(52) U.S. Cl. ............ 156/78; 156/79; 156/334; 428/625; 428/626; 428/315.9

(58) Field of Classification Search .................... 156/78, 156/79, 281, 330, 334; 428/625, 626, 315.9, 428/313.5
See application file for complete search history.

(56) References Cited

U.S. PATENT DOCUMENTS

| | | | |
|---|---|---|---|
| 4,628,490 A * | 12/1986 | Kramer et al. | 367/1 |
| 4,851,271 A * | 7/1989 | Moore et al. | 428/34.5 |
| 6,617,364 B2 | 9/2003 | Soane et al. | |
| 2001/0011832 A1* | 8/2001 | Ehrlich et al. | 296/181 |
| 2009/0226755 A1* | 9/2009 | Sigler et al. | 428/626 |
| 2010/0004369 A1* | 1/2010 | Desai et al. | 524/405 |

* cited by examiner

*Primary Examiner* — Michael Tolin
(74) *Attorney, Agent, or Firm* — Reising Ethington P.C.

(57) ABSTRACT

Laminated metallic sheets which comprise an interior layer of a viscoelastic polymeric compound sandwiched between outer layers of metallic sheet may exhibit enhanced properties through modification of the viscoelastic phase. In a first embodiment the elastic modulus of the viscoelastic polymeric compound may be reduced by incorporating voids, bubbles or pores within the compound. These voids which may be introduced by introduction of polymeric microspheres are effective in reducing the internal stresses induced in the laminate by temperature changes. In a second embodiment, coating the microspheres with an electrically-conductive layer may be effective in enabling resistance spot welding of such laminated materials.

12 Claims, 3 Drawing Sheets

LAMINATED STEEL WITH COMPLIANT VISCOELASTIC CORE

TECHNICAL FIELD

This invention is related to means of enhancing the manufacturing characteristics of a composite, stampable sheet comprising outer metallic layers bonded together with a viscoelastic layer, through modification of the properties of the viscoelastic layer.

BACKGROUND OF THE INVENTION

Laminated metal sheet is a composite of a thin viscoelastic polymer layer sandwiched between outer layers of metal sheet. Typically the overall thickness of the laminated sheet is not greatly dissimilar to the thickness of a solid monolithic sheet. Hence laminated sheet may comprise metal sheets each ranging in thickness from 0.5 to 1 millimeter, with a viscoelastic core which may be as thin as 3 micrometers thick, but more commonly is about 50 micrometers thick. This thin viscoelastic layer is effective in providing sound and vibration damping. Thus, laminated steel finds application in automobile passenger cabins where it can reduce noise and vibration while offering advantages over more traditional approaches to noise reduction such as mastic, spray-on deadener, matting etc. In many cases, the metal sheets are steel, but the product is not restricted to specific metal sheet materials or alloys or grades of a specified material.

These laminated metal sheets are broadly compatible with the manufacturing processes employed for sheet metal panels but they also exhibit some unique characteristics. For example, the coefficient of thermal expansion of the viscoelastic core is substantially higher than that of any candidate metallic surface. Thus, when subject to thermal excursions, differences in the magnitude of the thermal expansion or contraction will lead to the development of interfacial stresses and possibly global deformation of the laminate. This behavior will be more pronounced if a temperature differential exists through the laminate thickness since this will give rise to differential stresses at the interfaces between the metal sheets and the viscoelastic layer. Also, viscoelastic materials are not electrical conductors. Hence without addition of conductive material to the viscoelastic core, conventional spot welding, the traditional joining method of choice for automobile bodies, is rendered difficult or impossible.

These characteristics impose additional design and manufacturing constraints and must be accommodated by users in applying laminated metal sheet. Thus, there are opportunities to broaden the utility of laminated metal sheet and more particularly, laminated steel sheet, by eliminating or reducing the manufacturing and/or in-use impacts of these characteristics.

SUMMARY OF THE INVENTION

Laminated metal sheet is a composite of a thin viscoelastic polymer layer sandwiched between outer layers of metal sheet. The metal sheets may be steel and the viscoelastic polymer may be a polyolefin or an epoxy.

This invention seeks to reduce the effect of two characteristics identified as typical of current laminated steel sheet: high thermal stresses arising due to the mis-match between the high coefficient of thermal expansion viscoelastic core and the much lower coefficient of expansion of the steel outer sheets; and the low electrical conductivity of the viscoelastic core.

Reduction in the thermal stresses may be achieved by reducing the elastic modulus of the viscoelastic core by incorporating voids within the viscoelastic core. Such voids may be produced in controlled volume fraction by the addition of hollow, compliant gas-containing micro-spheres into the viscoelastic core. Incorporation of voids by addition of microspheres assures formation of a closed cell 'foam' which will more effectively bar transport of atmospheric moisture into the viscoelastic core and thereby reduce opportunity for initiating corrosion of the metal sheets from their interior surface(s).

The electrical conductivity of the viscoelastic core may be enhanced by the incorporation of microspheres coated with a conductive medium and added in sufficient quantity to enable a continuous current path through the viscoelastic layer. In an embodiment the microspheres may be hollow and may serve to both reduce the elastic modulus of the viscoelastic core and enhance the laminate's electrical conductivity.

Other objects and advantages of the invention will be apparent form the following specific illustrative examples of practices of the invention. Reference will be had to drawing figures which are described in the following section of this specification.

DESCRIPTION OF PREFERRED EMBODIMENTS

Figure 1:
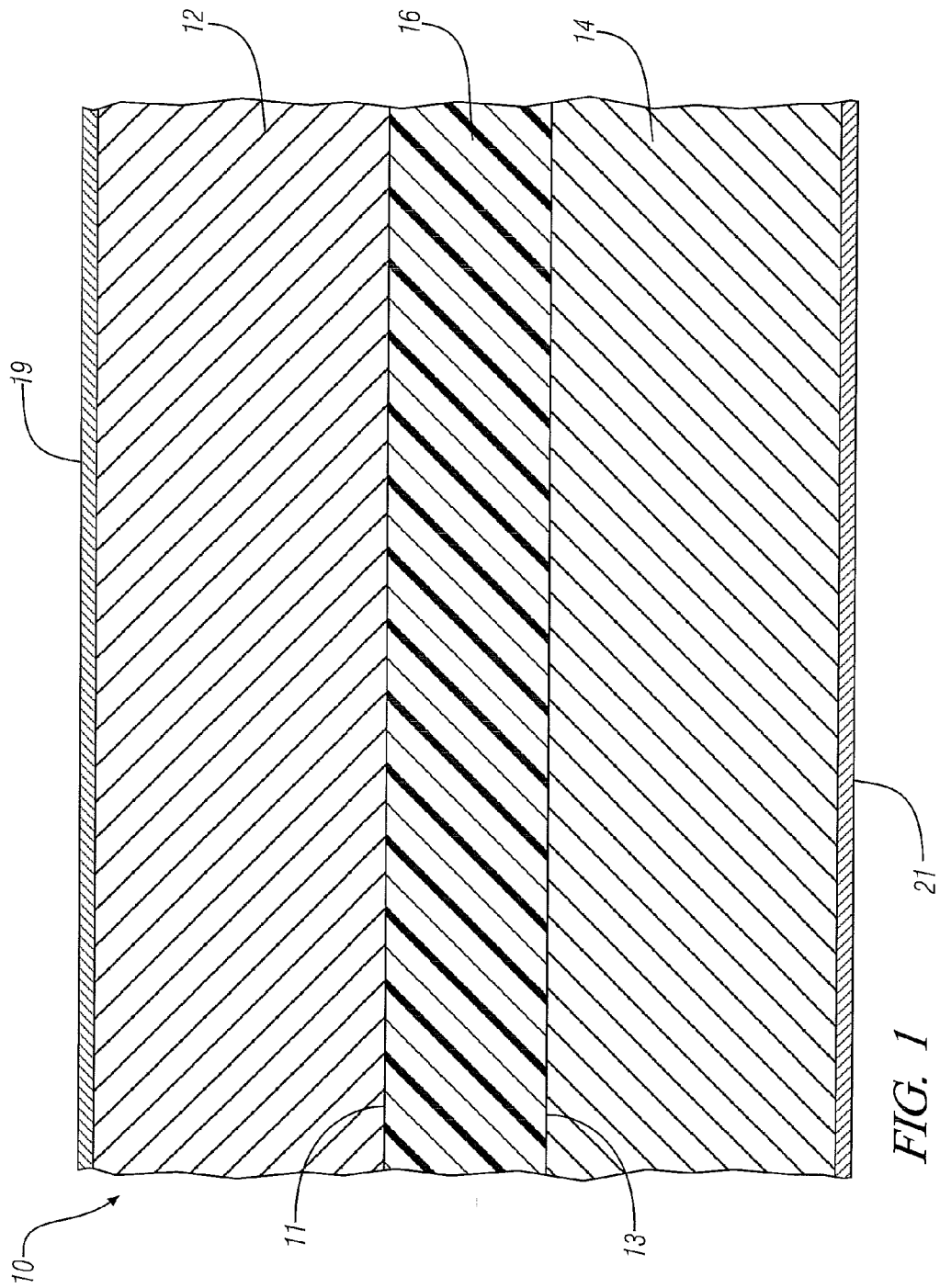
FIG. 1 is a cross-sectional view of a portion of a typical laminated steel sheet indicating the relative positioning of the respective layers.

FIG. 1 shows a fragment of a typical laminated steel sheet 10 comprising a viscoelastic layer 16, adhesively attached to two steel sheets 12 and 14, at sheet surfaces 11 and 13 respectively. At their other surfaces, not adhering to the viscoelastic layer, steel sheets 12 and 14 have decorative or protective coatings, 19 and 21 respectively. It will be understood that the features included and omitted from the figure are exemplary of a specific embodiment of the technology and are not intended to be limiting. For example only one of sheets 12 and 14 may be coated with its respective coating 19 or 21, and/or one or both of sheets 12 and 14 may be coated on both sides. Also coatings 19 and 21, although similarly depicted may have differing compositions and/or thicknesses.

Such sheets are desirable at least for their sound-deadening properties and find particular application in several areas of the passenger compartment of motor vehicles where transmission of engine or road noise into the passenger compartment may exceed desired levels. These sheets may also be formed using conventional press-forming techniques. To sustain the forming stresses without delamination of the viscoelastic core and the surface metal sheets, good adhesion between the metal sheets and the viscoelastic core is required. The viscoelastic core material, often a polyolefin or epoxy, may itself have suitable adhesive properties for bonding to the metal sheet. Alternatively a thin layer of adhesive, strongly adherent to both the metal sheet and the viscoelastic core, may be applied to the metal sheet/viscoelastic core interface. Adhesion may be further promoted by one or more of: preparing the metal sheet surface, for example, by cleaning or roughening the surface; and application of a coating to the metal surface. Such processes and procedures are well known to those skilled in the art and will not be detailed further. It is intended that all further discussion and description will relate to laminated metal sheets exhibiting good adhesion between the metal sheet and viscoelastic layer.

Although generally compatible with manufacturing processes developed for processing of monolithic metal sheet, not all monolithic processes are capable of direct application to laminated sheets. For example, the viscoelastic layer 16, in common with polymers generally, exhibits poor electrical conductivity. A preferred assembly procedure for assembling vehicle bodies is to use resistance spot welding in which a low voltage, high current electrical impulse is passed through overlying metal workpieces. The poor electrical conductivity of the viscoelastic layer impedes the passage of such a high current impulse and makes electric resistance spot welding of laminated steel problematic. While this issue may be addressed by incorporating conductive particles in the viscoelastic layer, the introduction of a relatively large volume of chemically dissimilar conductive material into the viscoelastic layer may itself raise issues.

Another issue raised by laminated steel is the discrepancy in coefficient of thermal expansion of the metal sheets 12, 14 and the viscoelastic layer 16. Typical thermoplastic polymers exhibit coefficients of thermal expansion of about $80 \times 10^{-6}$ $K^{-1}$ or greater. The coefficients of thermal expansion of structural metals used in automobiles are much less and generally do not exceed about $26 \times 10^{-6}$ $K^{-1}$; commonly-used steel sheets have a coefficient of thermal expansion of about $13 \times 10^{-6} K^{-1}$.

In laminated sheets the viscoelastic layer and the metal sheets are arranged in parallel and strongly bonded together so that the free expansion or contraction of the viscoelastic layer responsive to a temperature change will be resisted by the metal sheet. Thus the allowable displacement of the viscoelastic sheet constrained by the metal sheets will be less than its free expansion or contraction. The difference between the free and constrained length change, normalized to the free length of the composite in conjunction with the elastic properties of the viscoelastic layer will induce stresses in the viscoelastic layer. For stiff metal sheets (e.g., steel sheets) housing a flexible viscoelastic layer, the sheet elastic modulus is much greater than that of the viscoelastic layer, and the magnitude of these stresses ($\sigma$) may be estimated as:

$$\sigma = \{(\Delta l_{viscoelastic} - \Delta l_{metal\ sheet})/L_{free}\} \cdot E_{viscoelastic}$$

where $\Delta l_{viscoelastic}$=free change in length of viscoelastic sheet;

$\Delta l_{metal\ sheet}$=free change in length of metal sheet;
$L_{free}$=free length of the laminate;
and $E_{viscoelastic}$=Elastic modulus of the viscoelastic sheet; or, inasmuch as the stresses arise due to the length changes resulting from the difference in thermal expansion, this may be written as:

$$\sigma = \{(\Delta T(\alpha_{viscoelastic} - \alpha_{metal\ sheet})/L_{free}\} \cdot E_{viscoelastic}$$

where $\alpha_{viscoelastic}$=coefficient of thermal expansion of viscoelastic sheet;

$\alpha_{metal\ sheet}$=coefficient of thermal expansion of metal sheet;
and $\Delta T$=change in temperature which demonstrates that the stresses are proportional to the temperature rise, the difference in the coefficients of thermal expansion of the viscoelastic layer and the metal sheet and the elastic modulus of the viscoelastic sheet. Thus one approach to reducing the stresses developed due to thermal excursions is to reduce the elastic modulus of the viscoelastic layer.

The relationship between the properties of a multi-component solid and its components is frequently complex. The simplest approach is to apply, the 'Rule of Mixtures', which predicts that the elastic behavior of a multi-component solid is given by the weighted average of the elastic behaviors of the individual components. For a two-component solid this leads to a description of its composite elastic modulus, $E_{composite}$, as:

$$E_{Composite} = \phi_{Component\ 1} \cdot E_{Component\ 1} + \phi_{Component\ 2} \cdot E_{Component\ 2}$$

Where $\phi$ and E refer to the respective volume fractions and elastic moduli of the individual components While the details of such theory are not relied on, the theory embodies the generally-observed result that if the elastic modulus of a composite will reflect contributions from each component or constituent of the composite. In particular, for the special case where the elastic modulus of one component is zero, the resulting composite modulus will be reduced relative to the elastic modulus of the other component. The modulus of a gas-filled pore is zero. Thus if the viscoelastic medium is rendered porous, the elastic modulus of such a porous viscoelastic layer will be less than the elastic modulus of a continuous viscoelastic layer.

Figure 2:
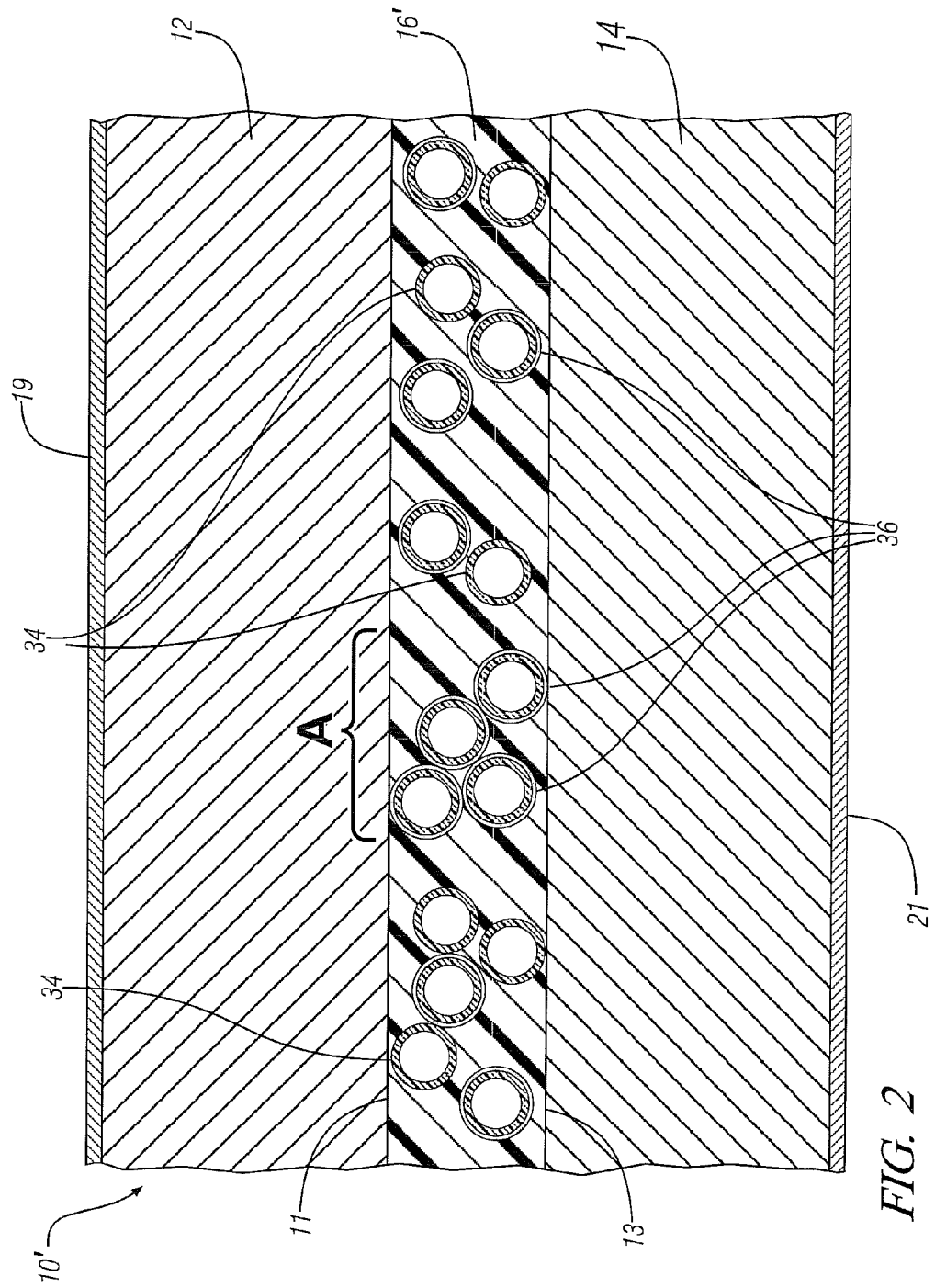
FIG. 2 is a cross-sectional view of a portion of a laminated steel sheet comprising a viscoelastic layer modified by incorporation of gas-filled internal pores. The pores shown are of two types: uncoated, polymeric shell, hollow microspheres; and polymeric shell, hollow microspheres coated with a conductive layer.

Thus, in an embodiment it is proposed to replace the continuous layer of viscoelastic material of FIG. 1 with a viscoelastic medium containing voids or pores such as is shown in FIG. 2. Such pores may be introduced by incorporating microspheres into the viscoelastic medium. Two types of pores are shown in FIG. 2: uncoated polymeric microspheres as shown at 34; and coated polymeric microspheres as shown at 36.

In the aspect, shown as 34, pores may be introduced by incorporating hollow microspheres into the viscoelastic material before the laminate is prepared. To be effective in reducing the modulus of the viscoelastic medium, the microsphere wall should respond to an applied stress in a manner comparable to the response of the viscoelastic medium. Hence, the microsphere wall should behave mechanically like the viscoelastic medium and should therefore have mechanical characteristics, specifically an elastic modulus, comparable to the elastic modulus of the viscoelastic layer. The microsphere need not be bonded to the viscoelastic medium but may be bonded without detriment to its performance.

Suitable microspheres may be fabricated by several methods. One approach is to introduce a generally spherical substrate material as a template; induce a second polymeric material to polymerize on it; and, usually chemically, dissolve the template material. Such a process often generates some fraction of damaged microspheres which, although generally spherical in form, exhibit surfaces which are not continuous but contain openings which could enable access to the interior. However, the generally small diameter of the microspheres and even smaller dimensions of any opening would probably forestall the filling of any such microspheres with the viscoelastic material in view of its relatively high melt viscosity.

A more preferred process for fabrication of hollow polymeric microspheres is to encapsulate a volatile liquid core within a thermoplastic polymeric shell, for example by interfacial polymerization. In this case the polymeric shell walls soften upon heating, and the volatile liquid core then expands the shell wall by vaporizing to form a hollow, nominally spherical particle. An advantage of this approach is that expansion of the liquid-filled plastic microcapsules can be triggered after their incorporation in the end-use product so that they may be mixed molded etc. while in their compact liquid-containing configuration.

It is also possible to surround decomposable solid chemical species with a polymer shell. Exposure of suitably-chosen solids to an elevated temperature may then soften the polymer while thermally-decomposing the solid to at least one gas, thereby expanding the particle. An exemplary activator is azodicarbonamide ($C_2H_4O_2N_4$). Upon exposure to elevated temperatures of 140 to 200° C. (less with an activator, typically a zinc salt such as zinc oxide or zinc stearate) the azodicarbonamide will decompose to $N_2$, $CO_2$, CO and $NH_3$.

Blowing agents, such as azodicarbonamide may be obtained as a fine powder, and be blended into and uniformly distributed within a suitable thermoplastic polymer at a temperature less than its decomposition temperature. The blowing agent-containing polymer may then be prepared as small particles by any suitable approach. One commonly-used approach to forming small particles is to melt the material then eject it as small droplets and allow the droplets to solidify. However the elevated temperature exposure required to render the thermoplastic material liquid may trigger premature decomposition of the blowing agent.

A more preferred approach is to cool the thermoplastic and its incorporated blowing agent below its glass transition temperature to render it brittle and readily fractured. The thermoplastic may then be ground and comminuted, for example, in a ball mill. After sizing and sorting the particles they may be individually heated, for example by rapid passage through a flame, to raise the temperature of the thermoplastic to a temperature at which the thermoplastic will flow and the blowing agent will decompose. As this temperature is attained, surface tension will first induce the particle, which as a result of repeated fracturing will be generally angular, to adopt a generally spherical shape. Subsequent decomposition of the blowing agent internal to the particle will generate internal pressure and promote the formation of hollow microspheres. Irrespective of the method adopted to form the microspheres, it is preferred that the microspheres be less than 20 micrometers in diameter and more preferred that they be less than 10 micrometers in diameter for suitable incorporation in viscoelastic layers. Microspheres of this size will encourage the viscoelastic composite layer to behave as a substantially uniform medium, and minimally impact its properties.

The microspheres will be uniformly mixed with the viscoelastic core material prior to attachment of the metal sheets and fabrication of the laminate. The volume fraction of such microspheres may range from about 10 percent to about 50 percent. The upper bound of 50 percent by volume being set by percolation theory which indicates that the viscosity of a flowable medium rapidly increases with the volume fraction of a solid second phase. The most dramatic increase in viscosity is observed as the fraction of the second phase approaches 50-65 percent by volume, the precise fraction depending on the size distribution.

As noted in the discussion of liquid-filled polymer shells, it is also feasible to mix the solid-containing or liquid-containing polymer shells with the viscoelastic core, assemble the laminate and then elevate the laminate temperature to a suitable temperature to vaporize the liquid or decompose the solid. Such in-situ void formation may be preferred if the thickness of the viscoelastic layer is very thin, for example less than 10 micrometers. This approach may also be followed if it is desired to increase the volume fraction of microspheres. The unexpanded shells will be more compact and have a lesser volume than the (expanded) microspheres. Thus achieving a preferred volume fraction of microspheres will require addition of a lesser volume of unexpanded shells and enhance the workability of the viscoelastic polymer mix. Conversely, this approach while still limited to about 50 percent by volume of polymer shells, may offer opportunity to exceed a 50 percent volume fraction of microspheres and may possibly enable 70 percent or greater volume fraction of microspheres.

It will be appreciated that microspheres formed using such mechanical incorporation of blowing agents into a thermoplastic as just described affords exceptional versatility in the choice of the thermoplastic. Thus virtually all thermoplastics may be employed to enable precise 'tailoring' of the microsphere wall properties. Thus, for example, the glass transition temperature and elastic modulus of the thermoplastic shell may be readily selected to adopt any desired degree of coincidence with the properties of the viscoelastic core. It will generally be preferred to have the elastic modulus of the thermoplastic shell mimic as closely as possible the elastic modulus of the viscoelastic layer. But variances in modulus of up to 50 percent may be accommodated without detriment to the beneficial consequences of the addition of such microspheres.

It is feasible to form pores or voids in the viscoelastic layer directly, for example by directly introducing a blowing agent into the viscoelastic medium or using other approaches well known to those skilled in the art. Such approaches, if not well controlled, however may lead to an open pore structure comprising interconnected pores. Such a structure could permit ingress of atmospheric water vapor and promote corrosion on the interior of the metal sheets. Mixing microspheres into the viscoelastic layer as individual entities will ensure that it will be surrounded by viscoelastic medium and will therefore form an array of separate and distinct voids, that is a closed void structure which will impede water vapor ingress.

A further advantage of using the addition of hollow microspheres is that the microspheres may be coated prior to their introduction into the viscoelastic medium. More particularly, the microspheres may be coated with an electrically-conductive coating to enhance the ability of the laminate to be resistance spot welded.

The conductive coating may be metallic or carbon-based. Both metallic and carbonaceous coatings may be deposited by physical vapor deposition (PVD) methods in vacuum. PVD is a line of sight process, and thus achieving uniformity of deposition is challenging but for this application coating uniformity is not critical and PVD would be an acceptable but relatively slow process.

A more rapid coating technique, also capable of laying down more uniform deposits is electroless deposition. This is preferred for metallic coatings but has the shortcoming that only a limited number metals are suited for electroless deposition. Fortunately copper, with its high electrical conductivity and tin which is effective in wetting steel surfaces during welding are among those metals which may be readily deposited. Other elements, including nickel and silver, can also be deposited but due to cost and processing limitations are less preferred.

To initiate electroless deposition on an electrically non-conductive substrate such a thermoplastic polymer, the surface must be prepared with a catalyst. The most often used catalysts consist of palladium with small amounts of tin. Once catalyzed, the microspheres may be uniformly coated by exposure to a suitable plating solution. In plating copper at ambient temperature for example, an aqueous solution comprising: NaOH at a concentration of 12 g/L; $CuSO_4.5H_2O$ at a concentration of 13 g/L; $KNaC_4H_4O_6.4H_2O$ at a concentration of 29 g/L; and HCHO at a concentration of 9.5 ml/L will yield satisfactory results.

Figure 3A:
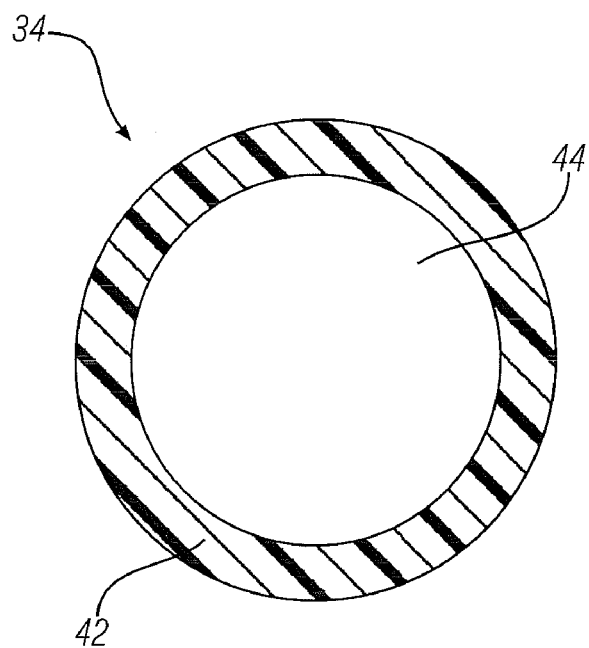
FIG. 3A is a cross-sectional view at about the mid-plane of a hollow microsphere with a polymer shell.
Figure 3B:
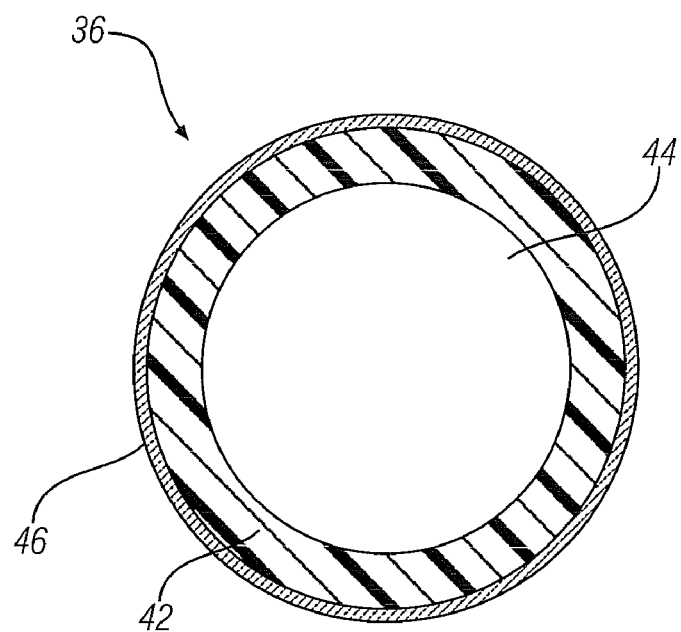
FIG. 3B is a cross- sectional view at about the mid-plane of a hollow microsphere with a polymer shell on which a conductive coating has been deposited.

FIG. 3A is a cross-section of a representative hollow polymeric microsphere 34 comprising a polymeric shell 42 enclosing a gas-filled interior volume 44. FIG. 3B illustrates a coated polymeric microsphere 36, the result of applying or depositing conductive coating 46 on gas-filled polymeric microsphere 34. Of course it will be appreciated that if the coefficient of thermal expansion mismatch between the metal sheets and the viscoelastic core is of minimal concern, because for example, the laminate is to be used only in a controlled-temperature environment, coated solid microspheres may also be employed. Such solid microspheres may be readily fabricated by comminuting a thermoplastic without blowing agent below its glass transition temperature as before and heating the comminuted particles to induce them to flow and adopt a generally spherical shape.

To be effective, the microspheres must be present in sufficient concentration to enable a continuous low (electrical) resistance path from sheet 12 to sheet 14 in laminated sheet steel 10' (FIG. 2). The specific volume fraction of conductive particles required to establish a conductive path depends on a number of factors, including the diameter of the microspheres and the thickness of the viscoelastic layer but it is believed that a volume fraction of conductive microspheres of between 30 and 60 percent would be suitable. In FIG. 2 the only particles 36 shown as forming a conductive path in viscoelastic layer 16' in the plane of the figure are shown in the cluster at 'A'. The coated particles 36 of cluster 'A' are in contact with one another and, at the extremities of the cluster, with steel sheet surfaces 11 and 13. 0f course the conductive path need not be continuous in any arbitrary plane of section and any grouping of contacting coated microspheres extending from, and in contact with, sheets 12 and 14 in any plane of section would be effective.

It will also be appreciated that a mixture, in suitable proportion, of coated solid and hollow microspheres may be employed if the volume fraction of hollow microspheres required for electrical conduction would reduce the elastic modulus to unacceptably low values.

Although the description above contains multiple examples relating to the practice of this invention, these examples should not be construed as limiting the scope of the invention but as merely providing illustrations of some of the presently preferred embodiments of this invention. Thus the scope of the invention should be determined by the appended claims and their legal equivalents, rather than by the examples given.

The invention claimed is:

1. A method of making a laminated sheet product comprising a first metallic sheet and a second metallic sheet, each sheet having an interior surface and an exterior surface wherein the interior surface of each sheet is adhered to and separated by a viscoelastic polymeric sheet comprising pores in predetermined volume fraction, the method comprising:
   preparing the interior surfaces of each of the metallic sheets for adhesion to the viscoelastic polymeric sheet;
   incorporating in a viscoelastic polymer a predetermined concentration of microspheres, the microspheres comprising a substantially-continuous polymer wall, which encloses a gas-filled interior volume, and an electrically conductive coating applied to the polymer wall, the polymer wall having an elastic modulus that differs from an elastic modulus of the viscoelastic polymer by less than 50 percent, and the microspheres being present in the viscoelastic polymer at a volume fraction that ranges from about 10 to 50 percent;
   forming the microsphere-containing viscoelastic polymer into a thin viscoelastic polymeric sheet having a predetermined thickness and first and second surfaces; and
   assembling the laminate by adhering the interior surface of the first metallic sheet to the first surface of the viscoelastic polymeric sheet and adhering the second metallic sheet to the second surface of the viscoelastic polymeric sheet.

2. The method of claim 1 wherein the viscoelastic polymer is selected from the group consisting of polyolefins and epoxy polymers.

3. The method of claim 1 wherein the viscoelastic polymeric sheet ranges in thickness from 3 to 50 micrometers.

4. The method of claim 1 wherein the size of the microspheres is less than 20 micrometers.

5. The method of claim 1 wherein the sire of the microspheres is less than 10 micrometers.

6. The method of claim 1 wherein the electrically conductive coating is selected from the group consisting of carbon, copper, tin, silver and nickel.

7. A method of making a laminated sheet product comprising a first metallic sheet and a second metallic sheet, each sheet having an interior surface and an exterior surface wherein the interior surface of each sheet is adhered to and separated by a viscoelastic polymeric sheet comprising pores in predetermined volume fraction, the method comprising:
   preparing the interior surfaces of each of the metallic sheets for adhesion to the viscoelastic polymeric sheet;
   incorporating in a viscoelastic polymer a predetermined concentration of polymer shells, the polymer shells comprising a layer of polymer, an electrically conductive coating applied to the polymer layer, and a medium surrounded by the polymer layer that is capable of exerting internal pressure to, and expanding, the polymer layer to form a gas-containing microsphere when heated, wherein the polymer layer has an elastic modulus that differs from an elastic modulus of the viscoelastic polymer by less than 50 percent, and wherein the polymer shells and the viscoelastic polymer are mixed to achieve a distribution of the polymer shells in the viscoelastic polymer;
   forming the polymer shell-containing viscoelastic polymer into a thin viscoelastic polymeric sheet having a predetermined thickness and first and second surfaces;
   assembling the laminate by adhering the interior surface of the first metallic sheet to the first surface of the viscoelastic polymeric sheet and adhering the second metallic sheet to the second surface of the viscoelastic polymeric sheet; and
   heating the laminate to expand the polymeric shells and form a plurality of gas-filled microspheres in the viscoelastic polymeric sheet, the microspheres heir present in the viscoelastic polymer at a volume fraction that ranges from about 10 to 50 percent.

8. The method of claim 7 wherein the diameter of the gas-filled microspheres is less than 20 micrometers.

9. The method of claim 7 wherein the diameter of the gas-filled microspheres is less than 10 micrometers.

10. A method of making a laminated sheet product, the method comprising:
   providing a first metallic sheet and a second metallic sheet, each sheet having an interior surface and an exterior surface;

assembling a laminated sheet product that includes the first metallic sheet, the second metallic sheer, and a viscoelastic polymeric sheet adhered to, and separating, the interior surfaces of the first and second metallic sheets, the viscoelastic polymeric sheet comprising a viscoelastic polymer medium; and introducing a distribution of hollow microspheres into the viscoelastic polymer medium either before or after assembling the laminated sheet product, the hollow microspheres comprising a polymer wall enclosing a gas-filled interior volume and an electrically conductive coating applied to the polymer wall, wherein the polymer wall has an elastic modulus that differs from an elastic modulus of the viscoelastic polymer by less then 50 percent, wherein the viscoelastic polymer sheet in the laminated sheet product comprises a volume percentage of the hollow microspheres of up to about 70%, and wherein the distribution of the hollow microspheres establishes an electrical flow path from the interior surface of the first metallic sheet to the interior surface of the second metallic sheet by way of contacting hollow microspheres.

11. The method of claim 10 wherein introducing the distribution of hollow microspheres comprises:

mixing polymeric shells into the viscoelastic polymer medium, the polymeric shells including a polymer layer surrounding a material that, when heated, is capable of exerting an internal pressure on the polymeric shells and expanding the polymer layer of the shells; and, after assembling the laminated sheet metal product, heating the laminated sheet metal product to expand the polymeric shells and form the hollow microspheres.

12. The method of claim 10 wherein introducing the distribution of hollow microspheres comprises:

mixing polymeric shells into the viscoelastic polymer medium, the polymeric shells including polymer layer surrounding a material that, when heated, is capable of exerting an internal pressure on the polymeric shells and expanding the polymer layer of the shells; and, before assembling the laminated sheet metal product, heating the viscoelastic polymer medium to expand the polymeric shells and form the hollow microspheres.

* * * * *